May 18, 1965
G. H. E. LISSAC
3,184,359
APPARATUS FOR THE ASSEMBLY OF OPHTHALMIC
LENSES IN SPECTACLE FRAMES
Filed May 14, 1962
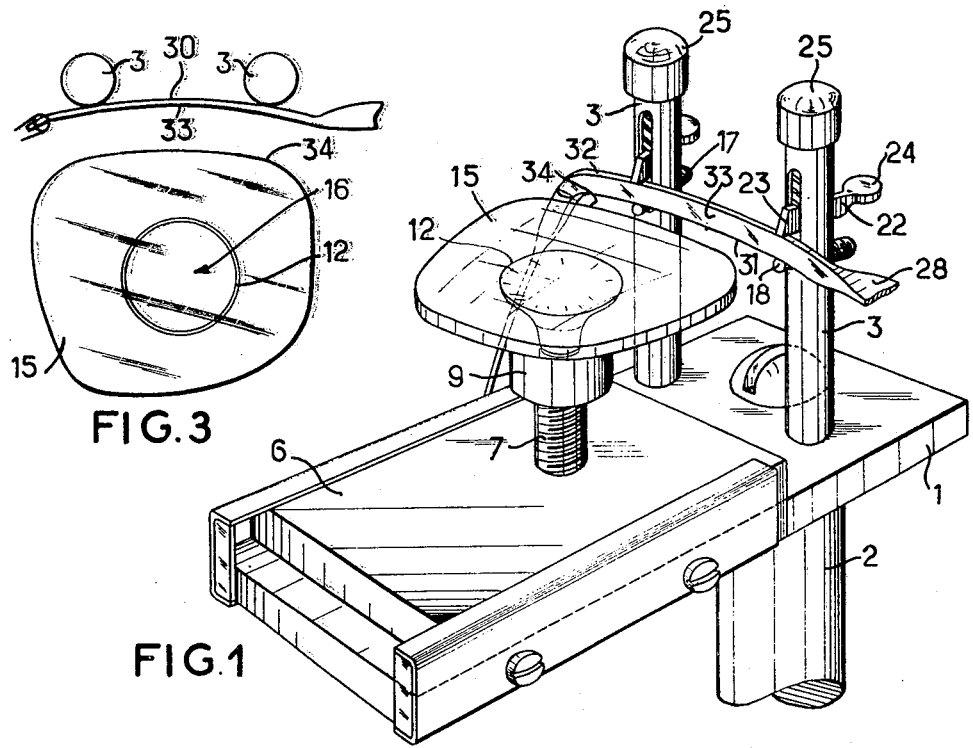
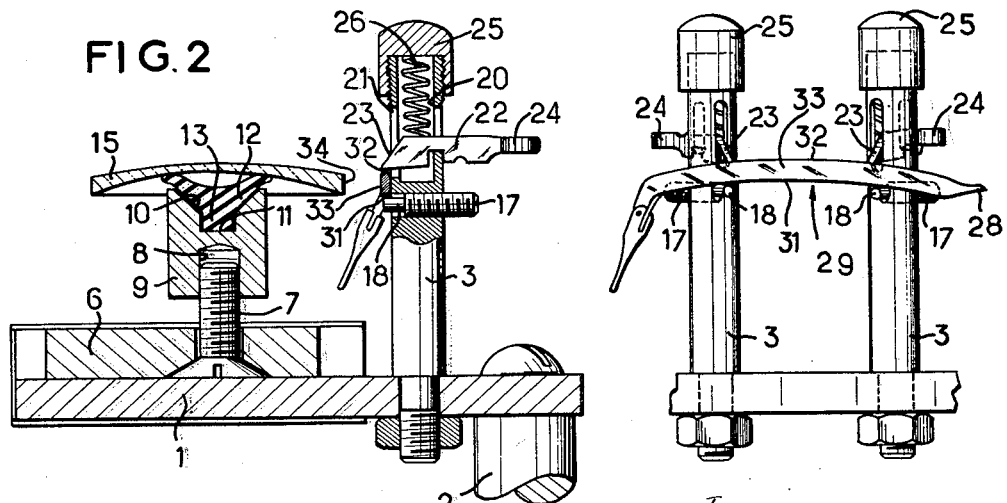
INVENTOR:
GEORGES HECTOR EMILE LISSAC
BY  Irving S. Thompson
ATTORNEY

United States Patent Office 3,184,359
Patented May 18, 1965

3,184,359
APPARATUS FOR THE ASSEMBLY OF OPHTHALMIC LENSES IN SPECTACLE FRAMES
Georges Hector Emile Lissac, 8 Ave. Raphael, Paris, France
Filed May 14, 1962, Ser. No. 194,613
Claims priority, application France June 16, 1961, 865,156
6 Claims. (Cl. 156—349)

This invention relates to apparatus for the assembly of ophthalmic lenses in spectacle frames.

A main object of the present invention is to produce a device permitting simplification in the glueing operations, particularly where a rapidly polymerizing bonding agent is used, without limitation however to the use of a glue of this kind.

According to the invention, apparatus for the assembly of ophthalmic lenses in spectacle frames by glueing in particular, comprises a base on to which is attached means for setting and securing a spectacle frame, and a slider mounted in a slide on said base, and carrying adjustable means for holding a lens adapted to present said lens into contact with the frame by moving said slider towards the means for setting and securing said frame.

By means of this apparatus, it is possible to move the lens towards the spectacle frame, and by appropriate adjustment of the means holding the lens, to place the lens in a correct position relative to the frame.

Subsequently by manipulation of said guide unit, the two parts may be moved away from each other in order to coat the surfaces to be joined with glue, which are then brought together by further movement of the guide unit, the lens and frame being correctly aligned relative to each other by the preliminary adjustment.

In order that the invention may be more clearly understood, an embodiment thereof will now be described, by way of example, with reference to the accompanying drawings, in which:

FIGURE 1 is a perspective view of an embodiment of the apparatus according to the invention, showing a lens and frame in position, FIGURE 2 is a sectional view of the apparatus of FIGURE 1, and FIGURES 3 and 4 diagrammatically illustrate the relative positions of the lens and frame on the one hand, and of the frame and supporting uprights on the other hand.

In the embodiment illustrated in the drawings apparatus according to the invention comprises a horizontal base 1 fixed to the upper end of a vertical post 2 for example, the base having a rectangular form. Mounted along a shorter side are two vertical uprights 3. The base 1 also includes a slide 5 in which a slider 6 is slidable along the longitudinal axis of said base, which slider may thus at will be brought closer to or moved away from the uprights 3.

In the region of its end which is nearer to the uprights 3, the slider 6 carries a vertical threaded rod 7 which is engaged in a tapped bore 8 of a cylindrical piece 9. A small conical cup 10 which is coaxial with the rod 7 and whose base has a cylindrical bore 11, is adapted to receive a suction cup 12 made of rubber for example, equipped with a shank 13 which is engaged in the bore 11. The dimensions of this suction cup are determined in such manner, that it can turn freely in the bore 11 and the cup 10 relative to the cylindrical piece 9. It will be noted, that in these conditions, it is possible to raise or lower the piece 9 relative to the slider 6, by screwing the piece 9 along the rod 7, without directional change of position of the suction cup.

It is possible to secure a lens 15 on the piece 9 by means of the suction cup 12, by placing the point on the lens coinciding with the axis of rotation of said lens during its grinding in alignment with the axis of said piece 9. In this manner, the generatrices of the lens section 9, are parallel to the axis of the piece 9 and are vertical.

Each upright 3 carries a radial supporting peg 17 which has a smooth end 18 providing a rest or abutment projecting towards the piece 9. These rests may be made to protrude to a greater or lesser extent from the uprights.

The upper end of each upright moreover has a blind bore 20 terminating slightly above the peg 17, as well as a diametrical slot 21 for the passage of a clamping lever 22, one end 23 of said lever being in alignment with the rest 18 and the other end of said lever having a knob 24. The end of each upright 3, which is externally screw-threaded, receives a cap 25, there being a helical spring 26 housed in the bore 20 and bearing against the base of the cap 25 on one side and on the lever 22 on the other, the end 23 of the lever 22 thus being resiliently thrust towards the rest 18. The magnitude of the thrust exerted by this spring 26 on the lever 22 may be modified and adjusted by screwing or unscrewing the cap 25 on the upright 3.

The uprights 3 so equipped, are adapted to hold and maintain in position a spectacle frame 28 to which the lenses 15 are to be attached by glueing.

The part 29 of said frame which is to receive the lens, as a rule has as its mean outline the line obtained by the intersection of two cylinders having substantially orthogonal axes. The upper section 30 of this part is placed in contact with the uprights 3, the rear face 31 of said part resting on the rests 18 while the levers 23 loaded by their springs 26 bear against the front face 32 of said part 29.

The spectacle frame slidable in contact with the rests 18 and uprights 3, may thus be aligned in position facing the piece 9, and is held in the position assumed, by means of the levers 23. It will be noted, that the lower section 33 of the part 29 of said frame is aligned on the piece 9, the generatrices of said section being vertical since they are parallel to the uprights 3.

The rests 18 project to a greater or lesser degree depending on the thickness of the frame rim.

The lens to be glued is placed in position on the suction cup 12 as previously specified, and is presented to the frame 28 before any glue is applied thereon.

Said action is carried out by bringing the mating parts 33 of the frame and 34 of the lens towards each other by sliding of the slider 6 and by vertical displacement of the piece 9.

The interpupillary setting may moreover be adjusted by sliding the frame laterally; it will moreover be noted in this connection, that a mark may be scribed on the base 1 in respect of this setting.

The alignment thus having been performed, the slider 6 is retracted, glue is spread on the lens and/or frame, the slider then being pushed forwardly again in order to apply the lens against the frame for the period required for glueing.

After the glueing operation, the lens is freed from the suction cup and the guide unit is retracted.

The glueing action occurs in perfect manner, the lens and frame sections being accurately positioned with respect to each other.

The invention is not limited to the embodiment described and illustrated, which is given by way of example only, but covers the variants which may be carried out within the scope of the invention, said variants in particular being applied to the setting and securing means provided for the frame or lenses.

I claim:
1. Apparatus for the assembly of ophthalmic lenses in spectacle frames by glueing, comprising a base, means attached to said base for setting and securing a spectacle frame, a slide formed on said base, a slider mounted in said slide, adjustable means carried on the slider for holding a lens, said adjustable means being adapted to present said lens into contact with the frame by moving the slider towards the means for setting and securing the frame.

2. Apparatus according to claim 1, wherein the setting means comprises two vertical uprights fixed to said base, a radial peg projecting from each upright, a clamping lever co-operating with said projecting peg and resilient means for impelling the lever towards the peg.

3. Apparatus according to claim 2, wherein the means for securing the lens comprises a vertical rod secured to the slider, a movable piece adapted for displacement along said rod, and a rubber suction cup mounted on one end of said movable piece.

4. Apparatus according to claim 3, wherein the suction cup comprises a cone of revolution and an axial shank extending said cone, said vertical rod is screw-threaded, and the movable piece is formed at its upper end with a cylindrical bore adapted to receive said shank and at its lower end with a tapped bore in which said screw-threaded vertical rod engages.

5. Apparatus for the assembly of ophthalmic lenses in spectacle frames by glueing, comprising a base, means attached to said base for setting and securing a spectacle frame, a slide formed on said base, a slider mounted in said slide, a vertical rod secured to the slider, a movable piece adapted for displacement along said rod, and a rubber suction cup for holding a lens mounted on one end of said movable piece, whereby sliding movement of the slider towards said setting and securing means presents a lens held by the cup into contact with the frame.

6. Apparatus according to claim 5, wherein the suction cup comprises a cone of revolution and an axial shank extending said cone, said vertical rod is screw-threaded, and the movable piece is formed at its upper end with a cylindrical bore adapted to receive said shank and at its lower end with a tapped bore in which said screw-threaded vertical rod engages.

References Cited by the Examiner
UNITED STATES PATENTS 2,210,360  8/40  Caldwell _____ 81—3.5
2,366,935  1/45  Schmid.

EARL M. BERGERT, *Primary Examiner.*

HAROLD ANSHER, *Examiner.*